Feb. 21, 1956  E. W. TODD  2,735,347
LIFT SHAFT FOR TRACTORS
Filed Dec. 13, 1954  5 Sheets-Sheet 1

INVENTOR:
Everett W. Todd
by James E. Nilles
Attorney

Feb. 21, 1956  E. W. TODD  2,735,347
LIFT SHAFT FOR TRACTORS
Filed Dec. 13, 1954  5 Sheets—Sheet 4

INVENTOR:
Everett W. Todd
by James E. Nilles
Attorney

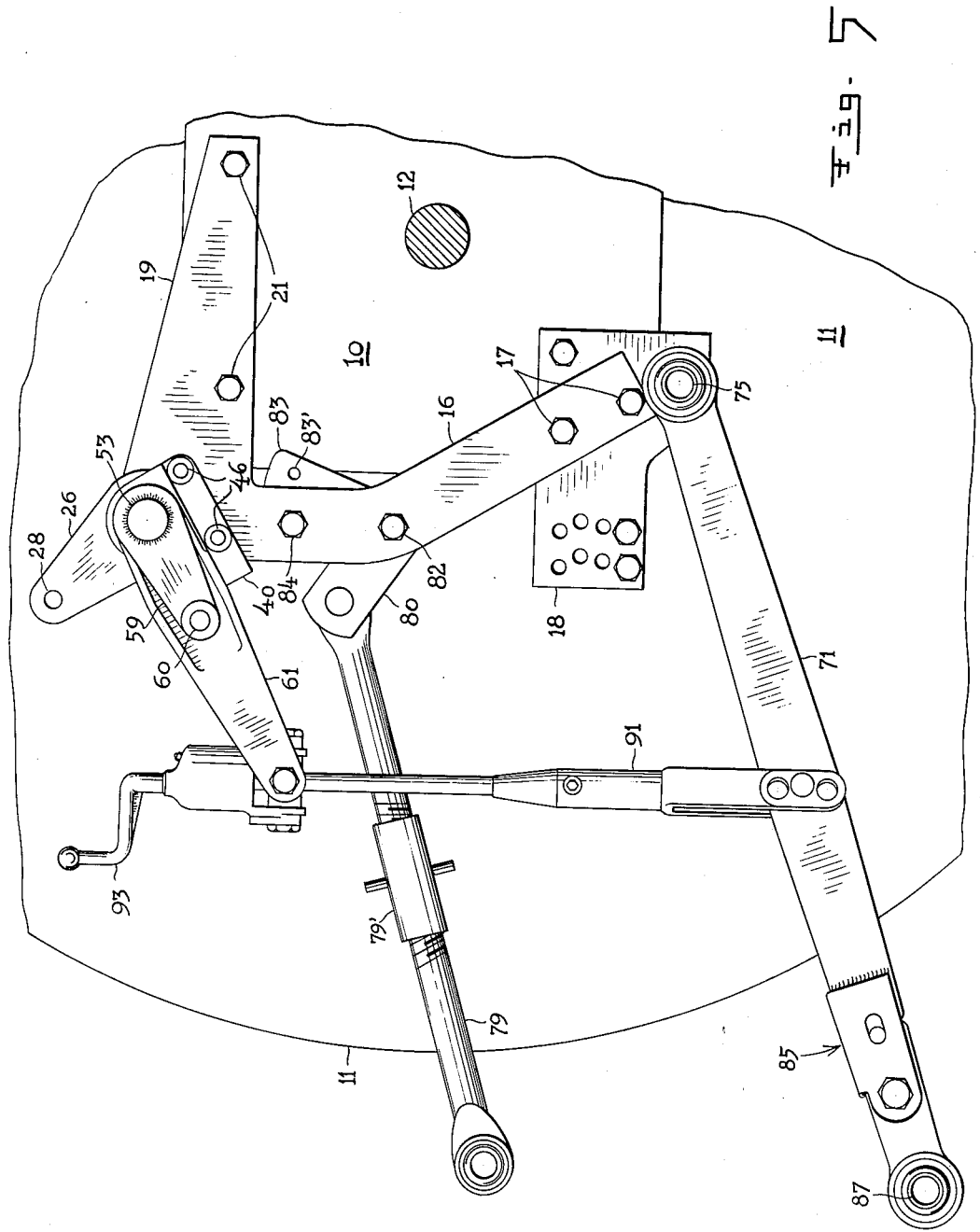

United States Patent Office

2,735,347
Patented Feb. 21, 1956

2,735,347

LIFT SHAFT FOR TRACTORS

Everett W. Todd, Racine, Wis., assignor to Massey-Harris-Ferguson Inc., Racine, Wis., a corporation of Maryland Application December 13, 1954, Serial No. 474,785

10 Claims. (Cl. 97—46.43)

This invention relates to agricultural implements and is more particularly concerned with a tractor lift shaft for controlling implements which are associated therewith.

This invention is an improvement over the arrangement shown in my U. S. Patent #2,678,596, issued May 18, 1954.

In the use of tractor mounted implements, it is necessary, for certain operations, to be able to adjust the working position of the front mounted tools, independently of the rear mounted tools. At other times it is desirable to permit the rear mounted tool, such as a plow, to float independently of the front mounted implements, such as cultivators. For other operations it is necessary to raise or lower both sets of ground engaging tools simultaneously. In addition, to these functional requirements and characteristics, certain rear mounted tools such as a lister, require lateral stability while in the operating position, while other implements, for instance cultivators mounted on a wide tool bar, require considerable lateral flexibility in order to accommodate undulating ground over which they traverse.

It is therefore an object of this invention to provide a lift shaft, having a single source of power, which is highly versatile in accommodating a wide combination of front and rear mounted tools and positioning and controlling the same for various operating conditions.

It is a general object of this invention to provide an improved tractor lift shaft for mounted implements.

These and other objects and advantages will become more apparent as this disclosure progresses, reference being had to the accompanying drawings in which:

Figure 5 is a right side elevational view, on an enlarged scale, of the lift shaft taken on the line 5—5 of Fig. 4, with certain parts removed.

Figure 1:
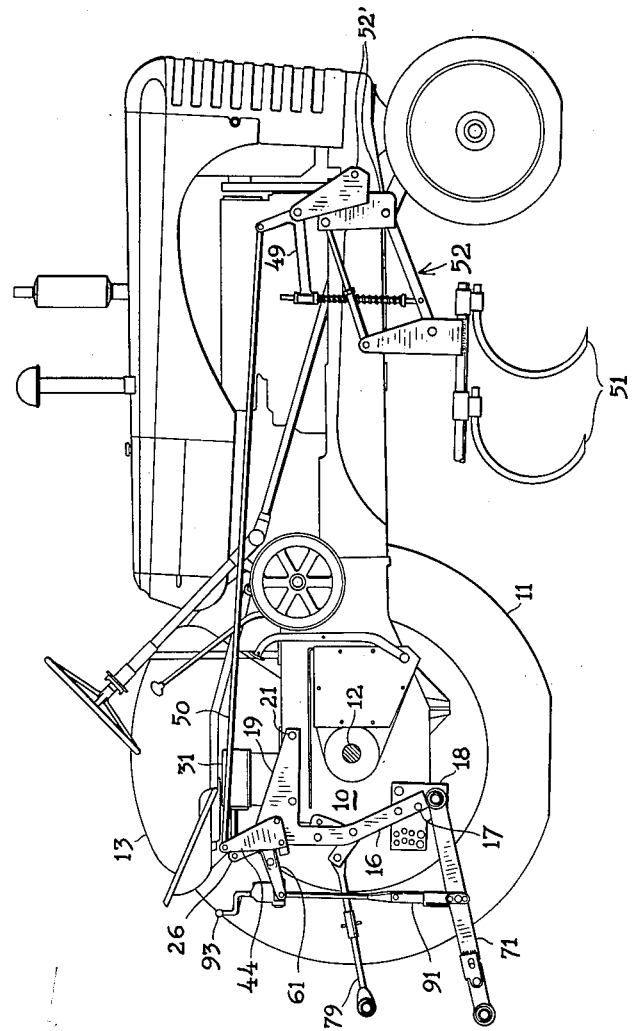
Figure 1 is an elevation side view of a tractor, with the near rear wheel removed, to which my improved lift shaft has been attached.

Referring now more particularly to the drawings, the rear end of the tractor housing 10 is supported by the tractor wheels 11 which are mounted on the axle 12. The tractor has the conventional fenders 13 between which is located this particular embodiment of the invention.

The supporting structure for mounting this lift shaft arrangement to the tractor housing 10 comprises members 15, 16, the lower ends of which are secured by means of bolts 17 to a lower portion of the housing 10. Attaching plates 18 for the drawbar (not shown) are also secured to the housing at this point but form no part of this invention. The upper portion 19 of the support structure extends forwardly along the sides of the tractor housing 10 and is secured thereto by means of cap bolts 21. At the upper rearward portion of this support structure are secured laterally spaced bearing collars 22, 23, in which is rotatably mounted a tubular member 25.

Welded to the central portion of tube 25 is an upstanding arm 26 having an aperture 28 at the free end thereof. A power lift, shown as a double acting, fluid motor 31, in the form of a two-way cylinder and piston (Fig. 1) is secured to the tractor and operated by the power source thereon (not shown). The piston rod 32 is connected to the free end of arm 26 by means of a clevis 34 bolted to the piston rod and pin 35. The tube 25 is in this manner rotatable in the collars 22, 23, in either direction, by the two-way power source on the tractor.

A one-way lift arm 37 which is in the form of a casting, is welded to the left end of tube 25 as at 38. A similar one-way lift arm 40 is welded as at 41 to the right end of tube member 25. Front mounted implement connections are provided at the outer side of each arm 37, 40 in the form of plates 43, 44 which are rigidly secured by means of cap bolts 45, 46 respectively, threadably engaged in tapped holes 46 in the arms 37, 40. Forwardly extending control rods 48, 50 are pivotally secured at the free ends of plates 43, 44 by means of bolts 46, 47 respectively. The control rods 48, 50 extend forwardly and are connected to bell cranks 49 which are operatively connected to front mounted implements and serve to raise and lower the same by forward and rearward movement, respectively, of the rods. As these front mounted implements and their mountings are conventional, it is sufficient to say that implements 51 are generally mounted on parallel arm rigs 52 which are pivotally attached to a laterally extending frame 52' rigidly mounted on the tractor. Thus, as the power lift means 32 is actuated, the tube 25 and one-way lift arms 37, 40 are rotated and the front mounted rigs are positively controlled in either direction to raise and lower them or to adjust their working depth. The front mounted implements are thus always under the influence of the power source 31.

Rotatably mounted within the tube 25 and protruding from either end, is a shaft 53, having welded at its left end, as at 54, a power lift arm 55. To the right end of shaft 53 is welded as at 57 a locking arm 59 at the free end of which is an aperture 60. Rotatably mounted near the right end of shaft 53 and adjacent locking arm 59, is another lift arm 61 having an aperture 61' registerable with aperture 60. By inserting the pin 63 in apertures 61' and 60, the lift arm 61 may be locked relative to the shaft 53 and thereby rotate in unison with its corresponding lift arm 55. Alternately, by removing the locking pin 63 the lift arm 61 is free to move independently of lift arm 55 for purposes which will appear more fully hereinafter.

Figure 3:
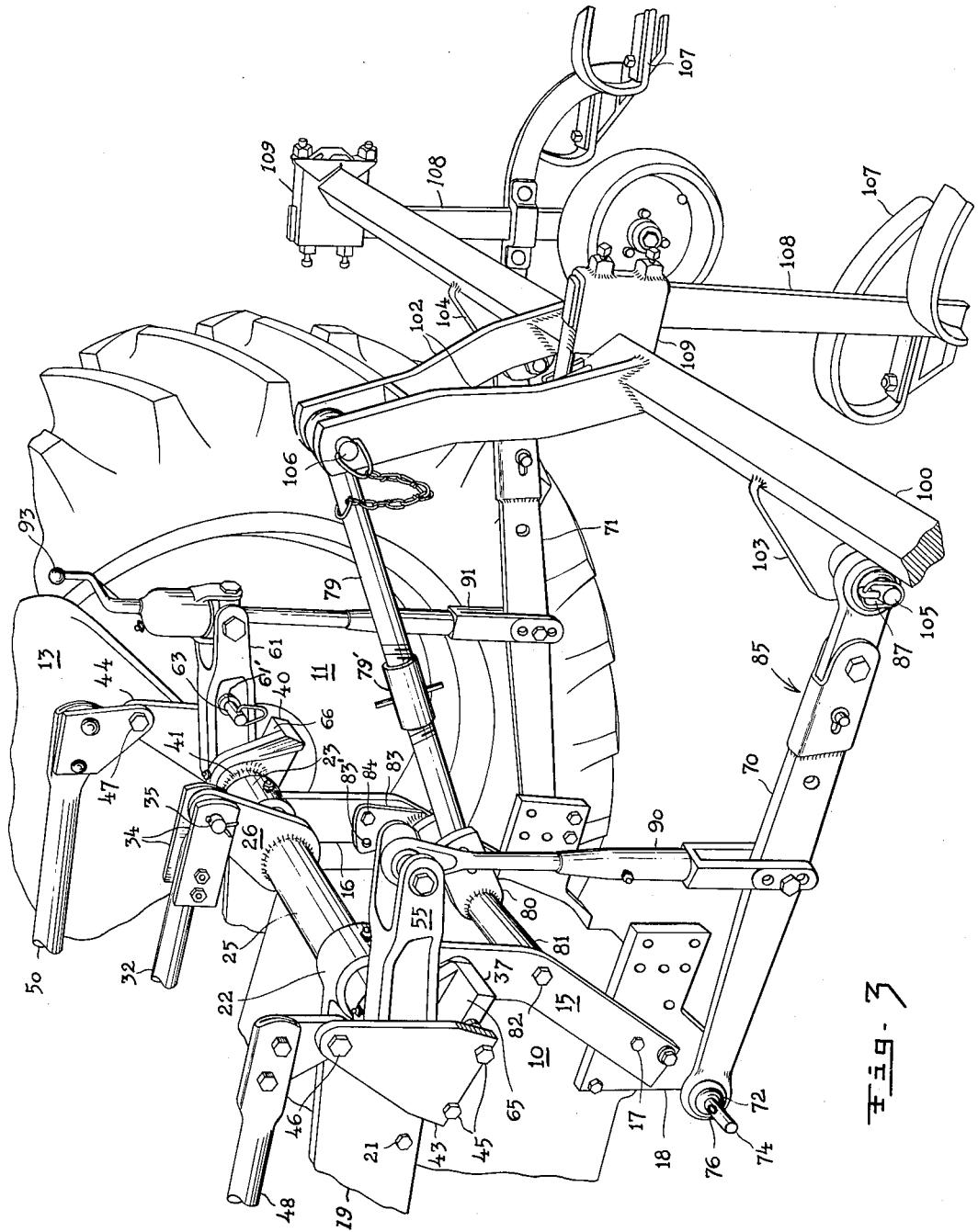
Figure 3 is a perspective view of the device shown in Fig. 1 taken from the left, rear, side of the tractor, with certain parts of the tractor being broken away for the sake of clarity.
Figure 4:
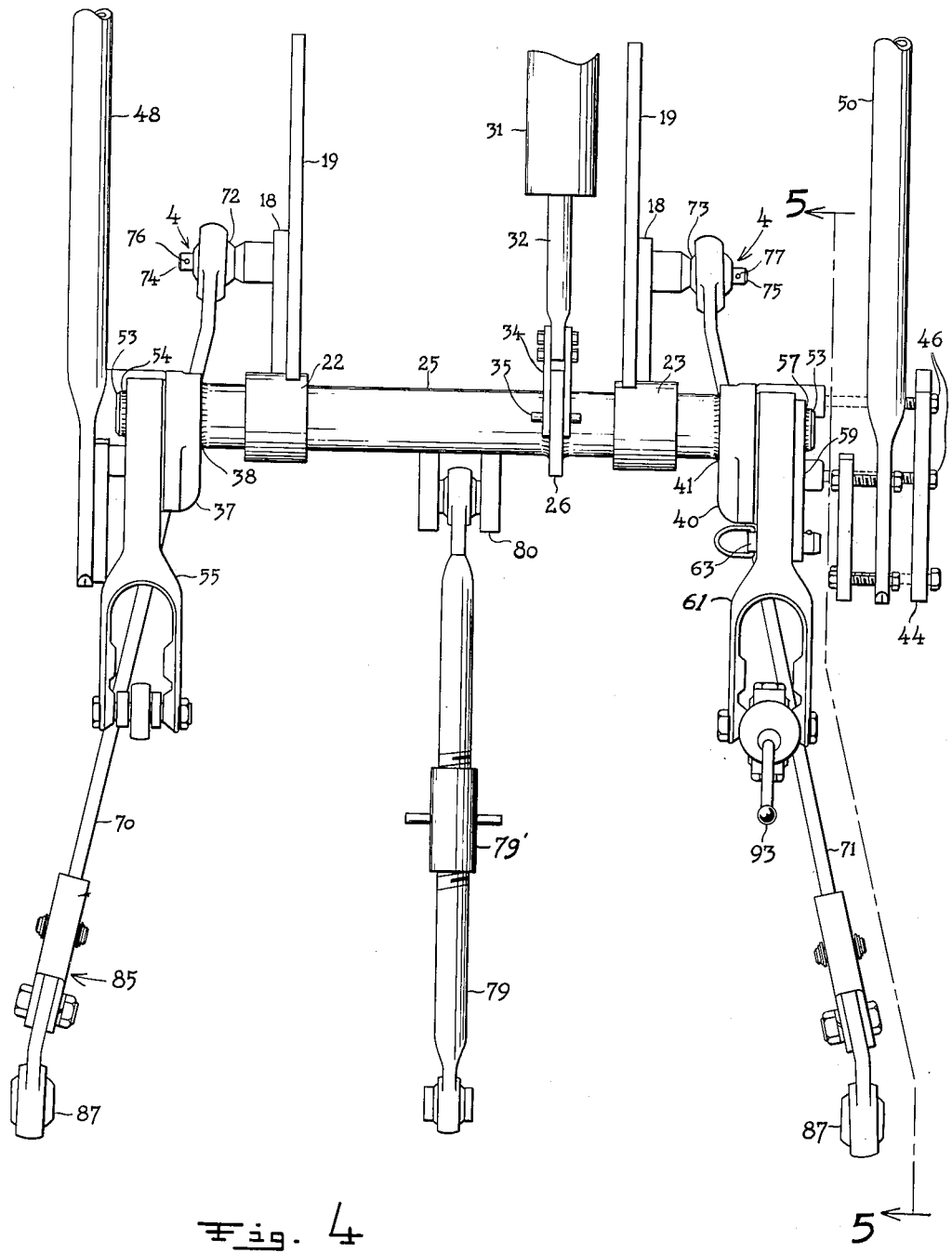
Figure 4 is a plan view, on an enlarged scale, of my improved lift shaft with certain parts of the connecting members broken away and with the right side front implement connection being shown in the exploded position.

A one-way lift connection is provided between tube 25 and shaft 53 in that the one-way lift arms 37, 40 have surfaces 65, 66 which abut with the lower surfaces of lift arms 55, 61, respectively, when the tube 25 reaches a predetermined position while being rotated in a clockwise direction as viewed in Fig. 5. Rotation of the tube 25 in this direction causes the one-way lift arms 37, 40 to pick up the power lift arms 55, 61, when a predetermined point in their rotational movement has been reached and continued rotation of the tube 25 causes the implement to be raised to the transport position. As shown in Fig. 3, however, the tube 25 has been rotated in the opposite direction sufficiently to cause the one-way arms 37, 40 to become disengaged from the power lift arms 55, 61 and in this position the latter are free of the influence of the rotative movement of the tube 25.

The means for connecting the rear implement frame to the tractor comprises the well known three point linkage arrangement of two lower laterally spaced tension members 70, 71 which are universally connected at their forward ends with the tractor frame 10 by means of conventional ball and socket connections 72, 73 held captive on the projecting pins 74, 75 by the keeper keys 76, 77. A compression, member 79, which is adjustable in length by means of a turnbuckle 79′, constitutes the third link and is secured at its forward end in a similar manner to the bracket 80 which is welded on shaft 81. Shaft 81 is rotatably secured between support structures 15, 16 on cap bolts 82 which extend through apertures in support structures 15, 16 and are threadably engaged in the shaft 81. To the right end of shaft 81 is welded an upstanding adjusting plate 83 (Fig. 3) which has apertures 83′ through the free end. Plate 83 is adjustably secured to support structure 16 by means of a bolt 84 extending through member 16 and registerable with either one of apertures 83′. By this means the convergence of the upper and lower links can be changed to accommodate different implements which may require different points of connection to the tractor in order to properly perform their functions. The rear ends of hitch links 70, 71 and 79, have conventional ball and socket connections for the reception of conventional pins on the implement frames to be described.

The break joint connection, designated generally by reference numeral 85, in the lower links 70, 71 forms the subject matter of my co-pending application, Serial No. 326,422, filed December 17, 1952.

Figure 2:
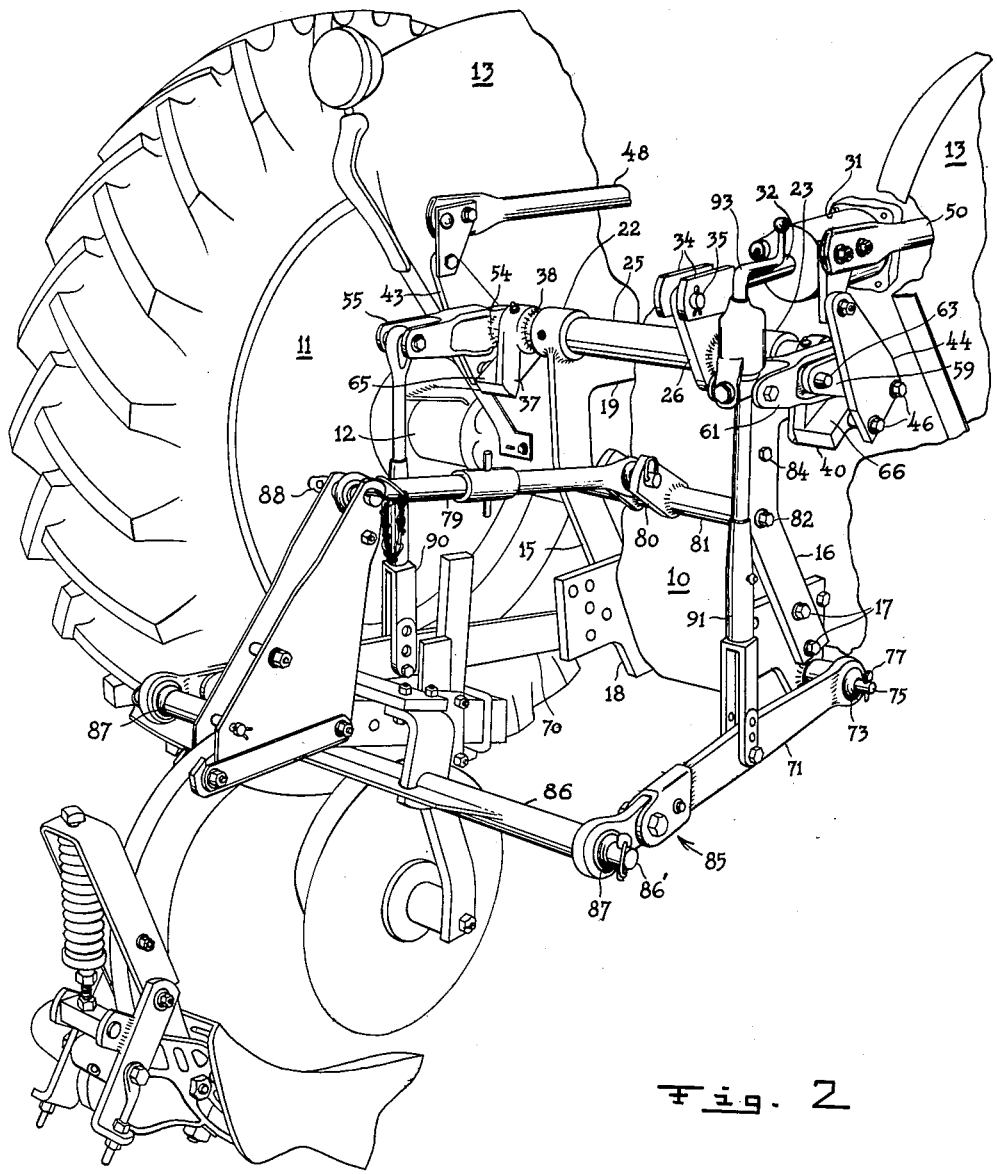
Figure 2 is a right, rear, perspective view of the improved lift shaft mounted on the rear of a tractor, certain parts of the tractor being broken away for the sake of clarity.

The implement shown in Fig. 2 is a one bottom lister and per se forms no part of this invention. It is sufficient to say that this implement frame comprises a transverse shaft 86 having a projecting pin 86′ at either end for the reception of the ball and socket joint 87 at the rear ends of draft links 70, 71. The upper portion of the implement frame receives the rear end of the compression link 79 by means of a keeper pin 88. With an implement of this type it is necessary to prevent lateral tipping of the implement while in the working position. Lateral stability is maintained by securing the power lift arm 61 to shaft 53 locking arm 59 to arm 61 by means of the pin 63 inserted in registering holes. The draft links 70, 71 are thus prevented from rotating relative to one another by the lift links 90, 91 which connect the draft links 70, 71 to the power lift arms 55, 61. In this manner the draft links 70, 71 rise and fall in unison, and in the working position the implement is free to float in a vertical direction, within limits in a downward direction as determined by the position of the one-way stop arms 37, 40. One of the links 91 has a conventional hand crank 93 which serves to level the implement in a transverse direction.

The implement shown in Figure 3 is a spring tooth cultivator which comprises a relatively long, transversely arranged, tool bar 100 and upstanding frame members 102 which form an A frame. Forwardly extending lug members 103, 104 are welded at spaced locations along the length of bar 100 and have laterally projecting pins 105 extending therefrom which receive the ball and socket connection 87 at the rear end of the draft links 70, 71. The compression link 79 is secured to the upper end of the A frame 102 by means of the pin 106 extending therethrough. Cultivating tines 107 are spaced laterally along the length of the tool bar 100 (only two rigs being shown) and secured thereto by conventional standards 108 and clamps 109. These tool bars are often of considerable length and it is necessary that one end of the tool bar is able to rise and fall independently of the other end in order that the working tools may follow the contour of the ground. When using this lift shaft with an implement of this type the locking pin 63 is removed and the lift links 70, 71 are thus free to rise and fall independently of one another.

When either of the rear mounted implements shown in Figs. 2 or 3 are in the working position, the tube 25 has been rotated, in a counter-clockwise direction as viewed in Fig. 5, sufficiently to move the one-way lift arms 37, 40 out of contact with the lift arms 55, 61. With the rear mounted implement thus free of the influence of the tube 25, the front mounted implements may be positively controlled in either vertical direction by the hydraulic cylinder 31 to vary their working depth when a two-way power source is utilized. When a single acting cylinder is used, power is available only to raise the front implements while gravity acts to lower them. In either event, as will be appreciated by those skilled in this art, it is important that the rear mounted tool is free to "float," while the working depth of the front tillage tools are capable of being adjusted as to working depth and positively held from going below a predetermined depth.

By removing locking pin 63 it is possible to cultivate with the front mounted tools and forcibly hold them to their working depth, while a wide rear mounted tool, such as shown in Fig. 3, is free to float and, in addition, free to tilt in a transverse direction. On reaching the end of the row, both front and rear mounted implements can be raised simultaneously. On the other hand, with the locking pin in place, the implement shown in Fig. 2, such as a lister or plow, can be held rigid in a transverse direction so as to prevent lateral tipping without the use of the gauge wheels, and it is free to float in a vertical direction while the front mounted implements are accurately controlled in both directions as to working depth. With this combination of implements, also, both front and rear tools can be lifted simultaneously.

It will now be apparent that a very versatile lift shaft has been provided to accommodate various combinations of front and rear mounted tools for use under various operating conditions.

Having thus shown and described my invention, what I desire to secure by Letters Patent is:

1. A lift shaft for a tractor comprising; a tube adapted to be rotatably mounted to said tractor, power means operatively connected to said tube for rotating said tube, a shaft rotatably mounted within said tube and extending therefrom at either end, a rearwardly extending lift arm secured to one end of said shaft, a second lift arm rotatably mounted on the other end of said shaft, means for locking said second lift arm with said shaft for rotation therewith, a one-way lift connection between said tube and said lift arms, front mounted implement connections secured to said tube for movement therewith.

2. A lift shaft for a tractor comprising; a support structure adapted to be secured to said tractor, a tube rotatably mounted on said support structure, power means adapted to rotate said tube, a shaft rotatably mounted within said tube and extending therefrom at either end, a rearwardly extending lift arm secured to one end of said shaft, a second lift arm rotatably mounted on the other end of said shaft, means for locking said second lift arm with said shaft for rotation therewith, one way lift connections between said tube and said lift arms, front mounted implement connections secured to said tube for movement therewith.

3. In combination with a tractor, a lift shaft comprising; a tube rotatably mounted on said tractor, power means operatively connected to said tube for rotating said tube, a shaft rotatably mounted within said tube, a rearwardly extending lift arm secured to said shaft, a second lift arm rotatably mounted on said shaft at a spaced location from said first lift arm, means for detachably locking said second arm with said shaft for rotation therewith, a one-way lift connection between said tube and said lift arms, front mounted implement connections secured to said tube for movement therewith.

4. In combination with a tractor having a support structure secured thereto, a tube rotatably mounted on said structure, power means mounted on said tractor and deriving its power therefrom and operatively connected to said tube for rotating said tube, a shaft rotatably mounted within said tube, a rearwardly extending lift arm secured to said shaft for rotation therewith a second rearwardly extending lift arm rotatably mounted on said shaft at a spaced location from said first lift arm, means for detachably locking said second arm with said shaft for rotation therewith, a one-way lift connection between said tube and said lift arms, front mounted implement connections secured to said tube for movement therewith.

5. A lift shaft for a tractor comprising; a tube adapted to be rotatably mounted to said tractor adjacent the rear end thereof, a double-acting power means operatively connected to said tube for rotating said tube in either direction, a shaft rotatably mounted within said tube and extending therefrom at either end, a rearwardly extending lift arm secured to one end of said shaft, a second lift arm rotatably mounted on the other end of said shaft, means for locking said second lift arm said shaft for rotation therewith, a one-way lift connection between said tube and said lift arms, front mounted implement connections secured to said tube for movement therewith.

6. A lift shaft for a tractor comprising; a support structure adapted to be secured to said tractor adjacent the rear end thereof, a tube rotatably mounted on said support structure, a double-acting power means adapted to rotate said tube in either direction, a shaft rotatably mounted within said tube and extending therefrom at either end, a rearwardly extending lift arm secured to one end of said shaft, a second lift arm rotatably mounted on the other end of said shaft, means for locking said second lift arm with said shaft for rotation therewith, one way lift connections between said tube and said lift arms, front mounted implement connections secured to said tube for movement therewith.

7. In combination with a tractor, a lift shaft comprising; a tube rotatably mounted on said tractor adjacent the rear end thereof, a two-way power means operatively connected to said tube for rotating said tube in either direction, a shaft rotatably mounted within said tube, a rearwardly extending lift arm secured to said shaft, a second lift arm rotatably mounted on said shaft at a spaced location from said first lift arm, means for detachably locking said second arm with said shaft for rotation therewith, a one-way lift connection between said tube and said lift arms, front mounted implement connections secured to said tube for movement therewith.

8. In combination with a tractor having a support structure secured thereto and adjacent the rear end thereof, a tube rotatably mounted on said structure, a two-way power means mounted on said tractor and deriving its power therefrom and operatively connected to said tube for rotating said tube in either direction, a shaft rotatably mounted within said tube, a rearwardly extending lift arm secured to said shaft for rotation therewith, a second rearwardly extending lift arm rotatably mounted on said shaft at a spaced location from said first lift arm, means for detachably locking said second arm with said shaft for rotation therewith, a one-way lift connection between said tube and said lift arms, front mounted implement connections secured to said tube for movement therewith.

9. In combination with a tractor having front and rear mounted implements for vertical movement relative thereto, a tube rotatably mounted on said tractor adjacent the rear end thereof, a double-acting power means mounted on said tractor and operatively connected to said tube for rotating said tube in either direction, a shaft rotatably mounted within said tube, a rearwardly extending lift arm secured to one end of said shaft, a second lift arm rotatably mounted on the other end of said shaft, means for locking said second lift arm with said shaft for rotation therewith, one-way lift connections between said tube and said lift arms, link means connecting said lift arms with said rear mounted implements, front mounted implement connections secured to said tube, means operatively connecting said front mounted implements with said connections whereby the former are vertically positioned by rotation of said tube.

10. In combination with a tractor having front and rear mounted implements for vertical movement relative thereto, a support structure secured to said tractor adjacent the rear end thereof, a tube rotatably mounted on said structure, a two-way acting power means mounted on said tractor and deriving its power therefrom and operatively connected to said tube for rotation thereof in either direction, a shaft rotatably mounted within said tube and extending therefrom at either end, a rearwardly extending lift arm secured to one end of said shaft for rotation therewith, a second lift arm rotatably mounted on the other end of said shaft, means for locking said second arm with said shaft for rotation therewith, a one-way lift connection between said tube and said lift arms, link means connecting said lift arms with said rear mounted implements, front mounted implement connections secured to said tube, means operatively connecting said front mounted implements with said connections whereby the former are vertically positioned by rotation of said tube.

References Cited in the file of this patent
UNITED STATES PATENTS

| | | |
|---|---|---|
| 1,717,804 | Monson | June 18, 1929 |
| 2,337,638 | Brown | Dec. 28, 1943 |
| 2,368,125 | Evans | Jan. 30, 1945 |
| 2,368,156 | Orelind et al. | Jan. 30, 1945 |